Jan. 6, 1953 G. A. LYON, JR 2,624,635
WHEEL COVER
Filed Sept. 20, 1951
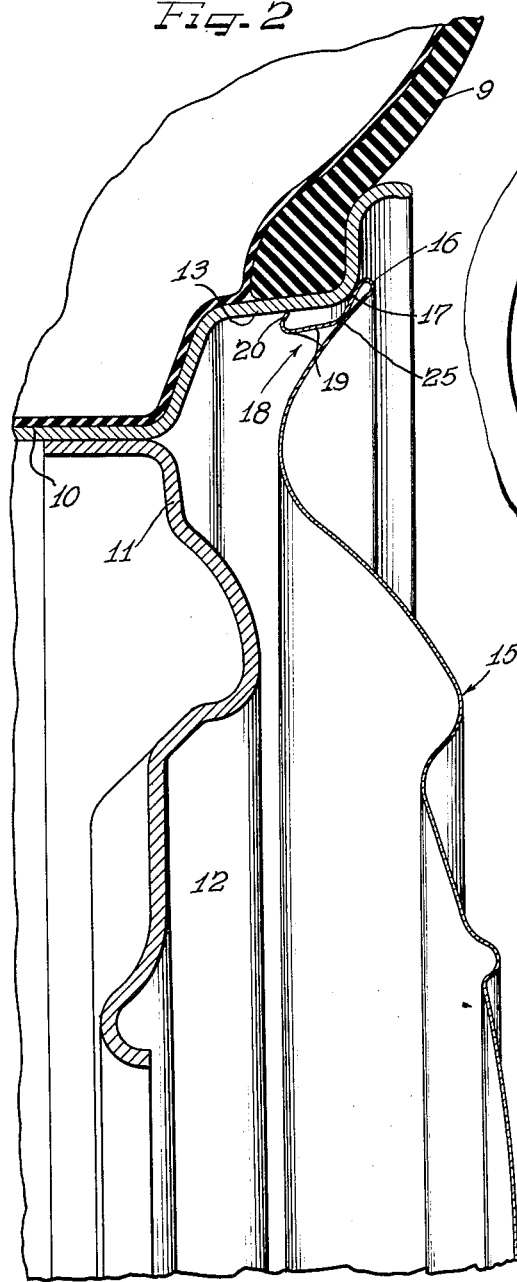
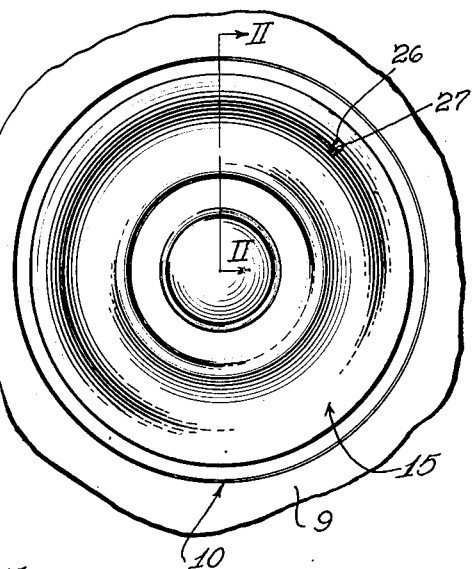
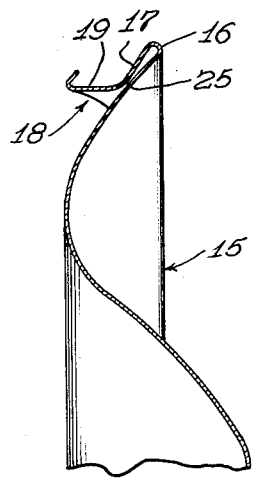
Inventor
GEORGE A. LYON, JR.
by
Attys.

Patented Jan. 6, 1953

2,624,635

UNITED STATES PATENT OFFICE 2,624,635

WHEEL COVER

George Albert Lyon, Jr., Detroit, Mich.

Application September 20, 1951, Serial No. 247,476

1 Claim. (Cl. 301—37)

This invention relates to wheel structures and more particularly to wheel covers for automobile wheels.

Recently in the fabrication of automobile wheel covers it has been necessary to use inferior types of steel due to the national emergency and war program. As a consequence, when steel is used that does not possess the resiliency of stainless steel, such as so-called nickel chrome steel, I find that it is desirable to provide some means in the cover itself for backing up the cover retaining fingers when the cover is in retaining cooperation with the wheel.

Accordingly, it is an object of this invention to provide a cover with self-retaining means which will have the necessary cover retaining characteristics even though a wide range of different steel sheet is used in the manufacture of the covers.

In accordance with the general features of this invention there is provided in a cover structure for a wheel, including a multi-flanged tire rim supported on a body member, a circular cover for disposition on the outer side of the wheel over the junction of the rim and body member, and including a plurality of circumferentially spaced resilient axially rearwardly projecting retaining fingers for engagement with a flange of the rim, the fingers comprising a part of a flange structure at the back side of the periphery of the cover and each including an axially projecting portion terminating in an edge inclined radially outwardly over the axial portion for retaining wedged engagement with the rim flange, said finger edges upon engagement with the rim flange being yieldable to wedge the fingers against the back surface of the cover so that the fingers are backed up by the cover.

Other objects and features of this invention will more fully appear from the following detailed description taken in connection with the accompanying drawing which illustrates a single embodiment thereof and in which:

Figure 1 is a fragmentary side elevation of a wheel having my cover applied thereto;

Figure 2 is an enlarged fragmentary cross-sectional view taken on substantially the line II—II looking in the direction indicated by the arrows and showing the retaining fingers wedged tightly between the tire rim flange and the back of the cover; and Figure 3 is a fragmentary cross-sectional view of the cover similar to that shown in Figure 2 but illustrating the position of the fingers prior to its being wedged into engagement with the rim flange.

As shown on the drawings:

The reference character 9 designates generally a conventional type of pneumatic tire mounted in the usual way, upon a so-called multi-flange drop center type of rim 10. This rim is carried in the usual way upon a dished wheel body member or spider 11 having the customary central bolt-on flange 12 adapted to be detachably secured by bolts or cap screws (not shown) to a part on the axle of a vehicle.

The multi-flanged tire rim 10 has a series of step-like flanges, including a generally axially extending flange 13 with which my novel wheel cover is adapted to cooperate.

The present invention is particularly concerned with the wheel cover designated generally by the reference character 15 and more especially with its retention on the wheel. The cover 15 comprises a dished metallic stamping which may be either in the form of a circular disc or annulus as is now well known in the art. In the illustrated form I have shown the cover 15 as being a full disc extending clearly across the body 11 of the wheel. However, my invention is not particularly concerned with the central configuration of the cover, but rather with the peripheral retaining means employed for detachably holding the cover in a resilient snap-on engagement with the rim flange 13.

The cover 15 in its outer periphery includes a turned flanged structure 16 which may be carried by the cover either by forming it integral with the cover or by otherwise securing it to the periphery of the cover. This flange includes a generally radially inwardly projecting portion 17 formed at circumferentially spaced points into integral axially rearwardly projecting retaining fingers designated generally by the reference character 18.

Each of the fingers 18 includes a generally axially projecting portion 19 terminating in an edge portion 20 inclined radially outwardly over the axial portion 19 for detachable gripping engagement with the rim flange 13.

The fingers 18 are located generally in a common circle of such a diameter that the fingers are, prior to the application of the cover on the wheel, spaced from the back side of the cover at 25. In other words, the extremities 20 of the fingers are disposed in a circle of a greater diameter than the circle to which they are deflected radially inwardly upon application of the cover to the wheel.

In applying the cover to the wheel a hole 26 therein (Fig. 1) is first aligned with the conventional valve stem 27 and thereafter the cover is pressed manually onto the wheel, thus causing the finger extremities 20 to slide along the rim flange 13 and to be progressively wedged toward the back of the cover until the periphery of the cover is bottomed against the tire rim 10. At this time the fingers 18 will be tightly wedged at 25 (Fig. 2) against the back side of the cover. This results in the resilient cover-retaining pressure exerted by the fingers on the rim flange being supplemented materially so that there is less likelihood of the cover being jarred loose in its use on an automobile wheel.

It will be noted that the cover portion at 25 is recessed inwardly and slightly flattened so as to be in close proximity to the fingers, and to define an area on which the fingers can bottom when wedged between the rim flange 13 and said flattened portion. Also due to this flattened portion at 25 being brought in closer to rim flange 13, there is a closer hugging of the rim flange by the peripheral portions of the cover.

The cover, of course, is easily removable by the insertion of the blunt end of a pry-off tool under the flange 16 and by the forcible ejection of the cover out of its retained engagement with the rim flange 13.

It will be understood that modifications and variations may be effected without departing from the scope of the novel concepts of the present invention.

I claim as my invention:

In a cover structure for a wheel including a multi-flanged tire rim supported on a body member, a circular cover for disposition on the outer side of the wheel over the junction of the rim and body member and including an outer concave-convex margin having therebehind a plurality of circumferentially spaced resilient axially rearwardly projecting retaining fingers for engagement with a flange of the rim, said fingers comprising a part of a flange at the back side of said margin of the cover and each including an axially projecting portion terminating in an edge portion inclined radially outwardly over the axial finger portion for retaining wedged engagement with the rim flange, said finger edges upon engagement with the rim flange tightly wedging an intermediate portion of each finger between its edge and said cover flange against the back convex surface of the cover margin so as to be backed up thereby, the remaining portions of the finger on both sides of said intermediate portion being spaced from the cover.

GEORGE ALBERT LYON, Jr.

REFERENCES CITED

The following references are of record in the file of this patent:

UNITED STATES PATENTS

| Number | Name | Date |
| --- | --- | --- |
| 2,368,228 | Lyon | Jan. 30, 1945 |
| 2,404,390 | Lyon | July 23, 1946 |
| 2,574,491 | Lyon | Nov. 13, 1951 |